(12) United States Patent
Ullyott

(10) Patent No.: US 6,278,262 B1
(45) Date of Patent: Aug. 21, 2001

(54) AUXILIARY POWER UNIT SYSTEM AND METHOD OF OPERATING AN AUXILIARY POWER UNIT

(75) Inventor: Richard Raymond Wilson Ullyott, St. Bruno (CA)

(73) Assignee: Pratt & Whitney Canada Corp., Longueiul (CA)

( * ) Notice: Subject to any disclaimer, the term of this patent is extended or adjusted under 35 U.S.C. 154(b) by 0 days.

(21) Appl. No.: 09/467,786

(22) Filed: Dec. 20, 1999

(51) Int. Cl.$^7$ ........................................ H02P 9/04
(52) U.S. Cl. .................. 322/22; 322/38; 307/84
(58) Field of Search .................. 290/4 R, 4 A; 322/14, 16, 22, 29, 38; 307/64, 84

(56) References Cited

U.S. PATENT DOCUMENTS

| | | | |
|---|---|---|---|
| 3,764,815 | 10/1973 | Habock et al. | 290/52 |
| 4,184,083 | 1/1980 | Takeuchi | 290/40 C |
| 4,370,560 | 1/1983 | Faulkner et al. | 290/40 C |
| 4,456,830 | 6/1984 | Cronin | 290/27 |
| 4,494,372 | 1/1985 | Cronin | 60/39.07 |
| 4,542,722 | 9/1985 | Reynolds | 123/179 E |
| 4,967,096 | * 10/1990 | Diemer et al. | 307/19 |
| 5,127,220 | 7/1992 | Jesrai et al. | 60/39.02 |
| 5,152,141 | 10/1992 | Rumford et al. | 60/39.02 |
| 5,174,109 | 12/1992 | Lampe | 60/39.142 |
| 5,184,456 | 2/1993 | Rumford et al. | 60/39.02 |
| 5,408,821 | 4/1995 | Romero et al. | 60/390.02 |
| 5,493,201 | * 2/1996 | Baker | 322/10 |
| 5,594,322 | * 1/1997 | Rozman et al. | 322/10 |
| 5,635,768 | 6/1997 | Birch et al. | 290/40 C |
| 5,663,632 | 9/1997 | Roseman et al. | 322/59 |
| 5,729,059 | * 3/1998 | Kilroy et al. | 307/84 |
| 5,939,800 | * 8/1999 | Artinian et al. | 307/64 |
| 6,018,233 | * 1/2000 | Glennon | 322/22 |
| 6,037,752 | * 3/2000 | Glennon | 322/22 |

* cited by examiner

Primary Examiner—Nicholas Ponomarenko
(74) Attorney, Agent, or Firm—Jeffrey W. Astle

(57) ABSTRACT

An auxiliary power unit ("APU") system and methods used to bring such system on-line and off-line are disclosed. An APU generator forming part of an APU system, is brought "on-line" smoothly in order to replace a primary generator operating at a steady-state rotational speed that is interconnected with a load. A controller forming part of the APU system controls rotational speed of the APU and thereby the generator so that it approaches a rotational speed beneath the steady-state rotational speed of the primary generator. The controller then connects the APU generator to the load and the primary generator. This causes the APU generator to motor at the steady-state rotational speed dictated by the primary generator. Thereafter, the controller may increase rotational speed of the APU generator until it provides power to the load and the primary generator may be disconnected from the load. Advantageously, by allowing the APU generator to motor at the steady-state rotational speed of the primary generator, no high impact shocks are imparted to the generator. Moreover, preferably, the APU generator is coupled to an APU by an over-running clutch so that no torque is transferred from the generator to the APU. The primary generator may be re-connected to the electrical load, powered by the APU generator by first adjusting the rotational speed of the APU generator to a set-point beneath the steady-state rotational speed of the primary generator. Then the primary generator operating at the steady-state rotational speed may be interconnected to the load and the APU generator. This again causes the APU generator to motor at the steady-state rotational speed. Now, as the APU generator is no longer providing power to the load, it may be disconnected from the load.

19 Claims, 5 Drawing Sheets

AUXILIARY POWER UNIT SYSTEM AND METHOD OF OPERATING AN AUXILIARY POWER UNIT

FIELD OF THE INVENTION

The present invention relates to auxiliary power units ("APU"s), and more particularly to controllable APU systems that allow an APU powering an AC generator to be brought online and off-line without imparting high shock torques.

BACKGROUND OF THE INVENTION

APU systems are typically used as adjuncts to primary engines, in aircrafts and the like. An APU, typically in the form of an independent secondary gas turbine, provides shaft power to drive interconnected equipment requiring constant speed operation. Often, an APU is used to drive an electrical generator forming part of an APU system. APUs and APU systems are often used as secondary power sources when an associated primary engine is not fully operational. For example APU systems may be used to provide back-up power to the electrical power system of an aircraft, while grounded or during an in-flight emergency.

Often APU systems include gearboxes used to match the speed and torque requirements of interconnected generators. Most typically, the gearbox hard-couples the APU to the generator. During transient conditions, such as, for example, when the APU system is brought on and off-line, the gearbox and APU may be subjected to high impact torques.

Accordingly, the use of one or more clutches to disconnect the gearbox has been suggested. Such a clutch arrangement is, for example, disclosed in U.S. Pat. No. 5,174,109.

The APU generator, however, is often used to provide power to an operational electrical system. Mere use of a clutch will not necessarily guard against mechanical shocks imparted as a result of electrical phase and frequency differences between the APU generator output and the operational electrical system.

Accordingly, an improved APU system allowing electrical generators to be brought on-line and off-line, smoothly without imparting or being the subject of unnecessary torques is desirable.

SUMMARY OF THE INVENTION

In accordance with an aspect of the present invention, an APU generator forming part of an APU system, is brought "online" smoothly in order to replace a primary generator operating at a steady-state rotational speed that is interconnected with a load. The rotational speed of the APU generator is adjusted until it is beneath the steady-state rotational speed. Then, the APU generator is interconnected to the load and the primary generator. This causes the APU generator to accelerate and motor at the steady-state rotational speed dictated by the primary generator. Then, the rotational speed of the APU generator may be increased until it provides power to the load. Thereafter, the primary generator may be disconnected from the load.

Advantageously, by allowing the APU generator to motor at the steady-state rotational speed of the primary generator, no high impact shocks are imparted to the generator. Moreover, preferably, the APU generator is coupled to an APU by an over-running clutch so that no torque is transferred from the generator to the APU, while accelerating to its steady-state speed.

Similarly, a primary generator may be re-connected to an electrical load, initially powered by an APU generator forming part of an APU system, in accordance with an aspect of the present invention. Specifically, the rotational speed of the APU generator may first be adjusted to a set-point beneath the steady-state rotational speed of the primary generator. Then, the primary generator operating at the steady-state rotational speed may be interconnected to the load and the APU generator. This again causes the APU generator to accelerate and motor at the steady-state rotational speed. Now, as the APU generator is no longer providing power to the load, it may be disconnected from the load. Again, preferably, an over-running clutch prevents the torque from being transferred to the APU.

The invention may be embodied in an APU system including an electric generator, an engine and a controller in communication with the engine, controlling the system to operate in accordance with these methods of operation.

Other aspects and features of the present invention will become apparent to those of ordinary skill in the art, upon review of the following description of specific embodiments of the invention in conjunction with the accompanying figures.

BRIEF DESCRIPTION OF THE DRAWINGS

In figures which illustrate, by way of example only, preferred embodiments of the invention, FIG. 1 schematically illustrates an APU system exemplary of an embodiment of the present invention.

DETAILED DESCRIPTION

Figure 1:
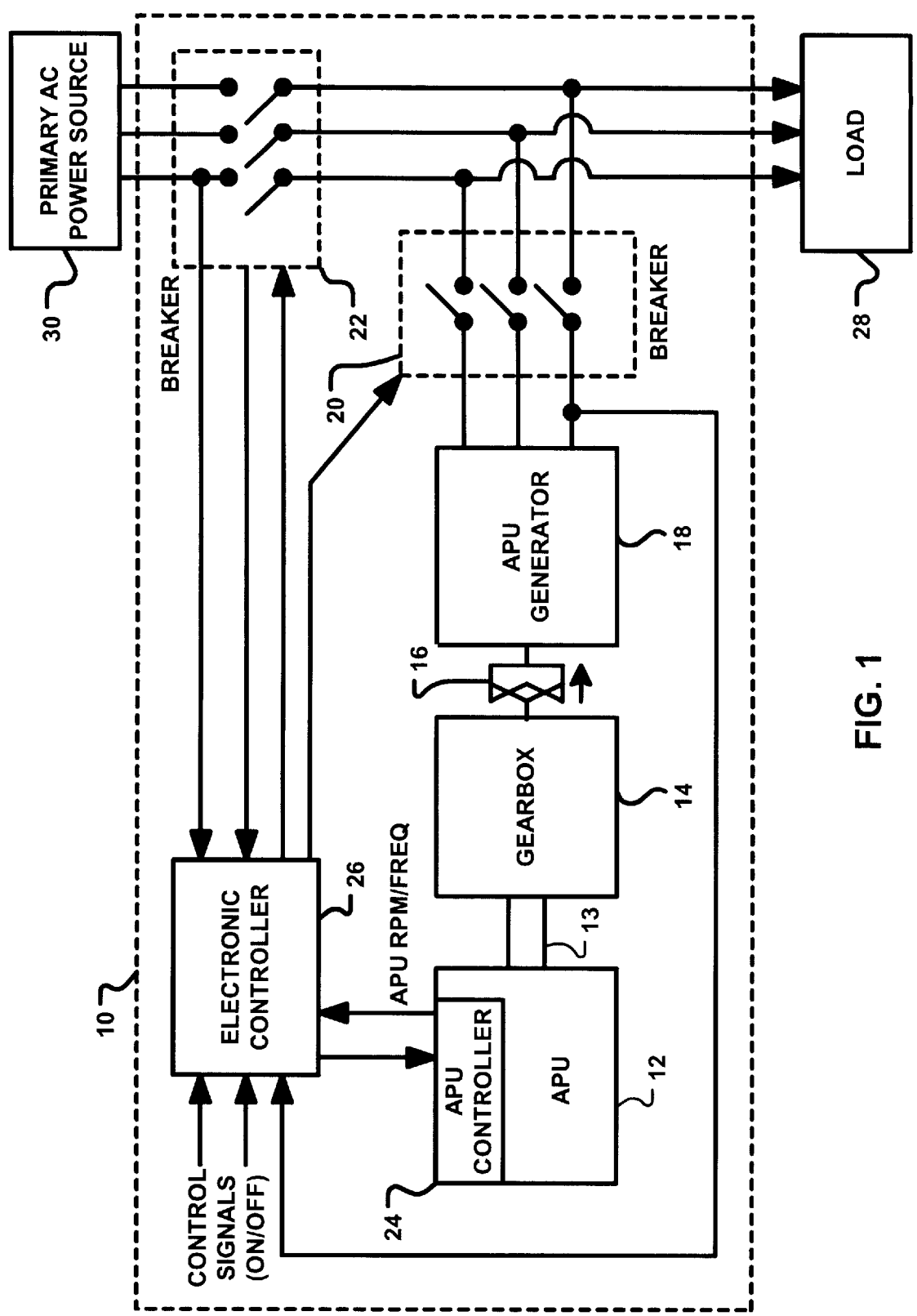

FIG. 1 illustrates an APU system 10, exemplary of an embodiment of the present invention. APU system 10 preferably forms part of an aircraft, and acts as an additional power source for the aircraft. Of course APU system 10 could be used in other applications, such as in a stationary generating station or ground power unit used to service aircrafts. APU system 10 includes an APU 12; gearbox 14; overrunning clutch 16; electric APU generator 18; first breaker 20; second breaker 22; APU controller 24; and electronic controller 26.

APU 12 is preferably an auxiliary gas turbine, separate from an associated main engine, such as a main airplane turbine engine. As such, APU 12 includes a rotating output shaft 13 that is mechanically coupled to drive an input to gearbox 14. The output of gearbox 14 is further mechanically coupled to an over-running clutch 16. This over-running clutch 16 is further coupled to electric APU generator 18. Of course, APU 12 need not be a turbine engine and, in some applications, could be formed using a conventional four stroke or other engine having a rotational output.

Gearbox 14 matches the speed of the output shaft of APU 12 to the rotational speed required by generator 18. Preferably gearbox 14 is a fixed ratio gearbox, chosen to achieve the desired matched speed, at steady state operating conditions. As will be appreciated by those of ordinary skill in the art, over-running clutch 16 is a conventional over-running clutch transmitting drive only from left to right. That is, in the event that the rotational speed of generator 18 exceeds that of the output of gearbox 14, no torque is transferred from generator 18 to gearbox 14. One type of clutch used for this purpose is commonly known as a Sprag clutch.

The electrical output of generator 18 is electrically connected to an electrical load 28, by way of first controllable breaker 20. Electrical load 28 may represent the main electrical system of an aircraft that includes APU system 10. Electrical load 28 is normally powered by a primary electrical power system including primary generator 30, which in turn is typically driven by the aircraft main turbine (not shown), or possibly a ground power unit used to service the aircraft. Controllable breaker 20 may be a conventional solenoid breaker. The control inputs of breaker 20 are interconnected with control output ports of electronic controller 26.

A second controllable breaker 22 interconnects primary generator 30 to load 28. Control inputs to breaker 22 are also interconnected with electronic controller 26 so that electronic controller 26 may connect or disconnect primary power source including primary generator 30 from load 28.

An APU controller 24 is interconnected with APU 12, and governs the rotational speed of the output shaft of APU 12. APU controller 24 may, for example be a digital electronic gas turbine control, as is customarily used in aviation applications, and thus may control the amount of throttle provided to APU 12, in response to electrical control signals. APU controller 24 takes as its inputs such electrical control signals as provided by electronic controller 26. Similarly, APU controller 24 provides to electronic controller 26, signals representative of the rotational speed of APU 12.

Electronic controller 26 is preferably a programmable logic controller, and as such preferably includes a general purpose programmable processor; computer storage memory; and a plurality of input and output ports (not specifically illustrated). Electronic controller 26 is in electrical communication with APU controller 24. Similarly, output ports of electronic controller 26 are in electrical communication with breakers 20 and 22, so that these breakers may be opened and closed by electronic controller 26. As well, electronic controller 26 senses the frequency and preferably also the magnitude of the output of primary electric generator 30, as well as the current provided by or to generator 18. As will be appreciated by those of ordinary skill in the art, the frequency of the output current of generator 30 or generator 18 will be proportional to the rotational speeds of generators 30 and 18, respectively. Additionally, electronic controller 26 may optionally sense the phase angle between the output of APU generator 18 and primary generator 30. Preferably, generators 30 and 18 are conventional synchronous machines.

The memory of electronic controller 26 is preferably loaded with program instructions adapting electronic controller 26 to function in manners exemplary of the present invention.

Figure 2:
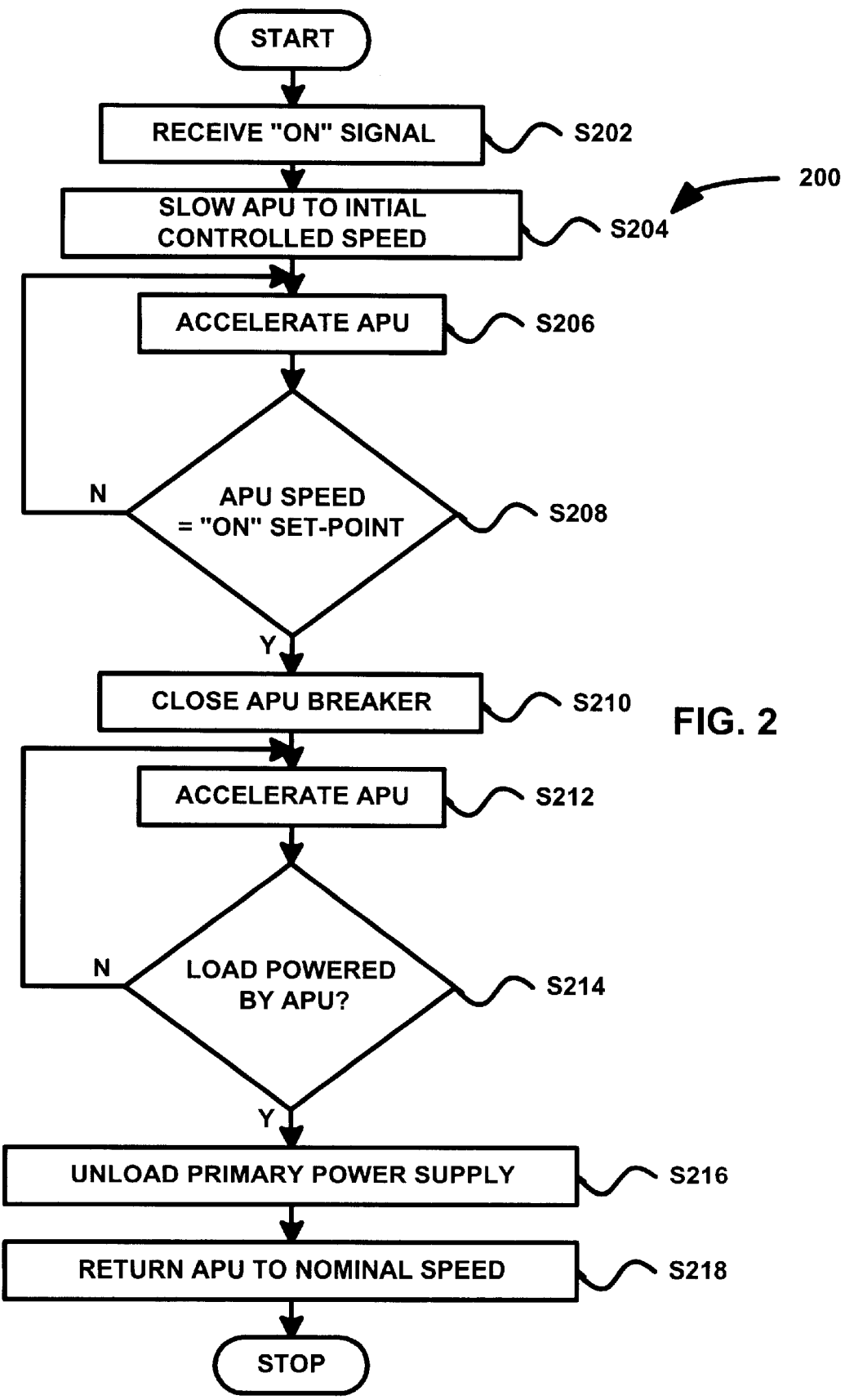
FIG. 2 is a flow chart of steps performed by the system of FIGS. 1 coming on-line.
Figure 3:
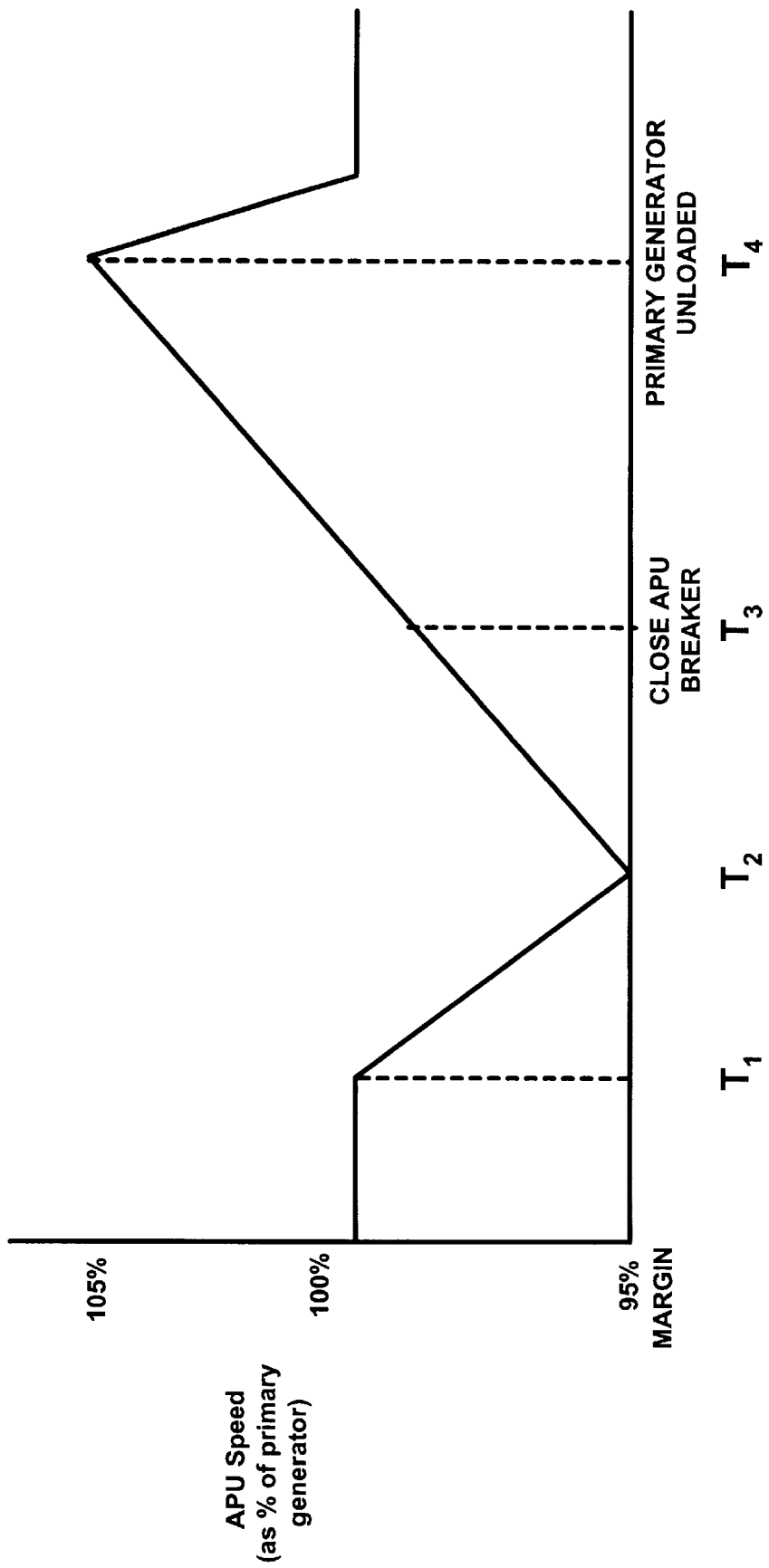
FIG. 3 illustrates an APU speed versus time control curve, used to bring the system of FIG. 1 on-line.

Steps 200 preferably performed by electronic controller 26, in bringing APU system 10 on-line are illustrated in FIG. 2. The corresponding controlled excursion (speed v. time) of APU 12 is illustrated in FIG. 3. As will be appreciated, breaker 22 is initially closed. Load 28 is thus initially powered by primary generator 30.

As illustrated, APU system 10 receives an on-line control signal in step S202 at $T_1$. The on-line control signal may be provided to electronic controller 26 by the main aircraft or similar control system (not illustrated) or by a manual signal provided by an operator.

In response, electronic controller 26, provides necessary electrical signals to APU controller 24 in step S204 causing APU controller 24 to slow APU 12 to an initial controlled speed. Alternatively, in the event that the APU 12 is not operating, electronic controller 26 causes APU controller 24 to start, and accelerate to this initial controlled speed. This causes generator 18 to output an AC current at a frequency below the desired steady-state output frequency of primary generator 30, at $T_2$. As illustrated in FIG. 3, this initial controlled speed/frequency preferably corresponds to 95% of the expected steady-state operating frequency of primary generator 30. As will be appreciated, the steady-state operating speed/frequency of primary generator 30 may be sensed by electronic controller 26, or may be pre-programmed as part of system 10.

Next, electronic controller 26 causes APU 12 to gradually accelerate until the frequency of the output of electrical generator 18 approaches an "on" set-point frequency, within a small percentage of the steady-state operating frequency (preferably equal to approximately 98% of the steady-state operating frequency) of primary generator 30, at $T_3$. Specifically, electronic controller 26 preferably senses the operating frequency of the output of primary generator, compares it to the rotational speed of APU generator 18. Electronic controller 26 then accelerates the APU 12 until the frequency of the output of APU generator 18 equals the "on" set point speed, in steps S206 and S208.

Next, once the frequency of the output of APU generator 18 approaches the generator output frequency closely enough so that generator 18 may act as a motor and pull itself into synchronism with the primary generator 30, electronic controller 26 closes breaker 20 in step S210. The electric output of APU generator 18 is thereby interconnected with load 28 and the output of primary generator 30 at $T_3$. At this point, APU generator 18 acts as a motor and is accelerated to synchronous speed by the interconnected primary generator 30. Over-running clutch 16, in turn prevents any torque from being transferred from APU generator 18 to gearbox 14. Optionally, controller 26 may also use the phase difference between generators 18 and 30, and close breaker 20 when the phase difference facilitates generator 18 acting as a motor. Electronic controller 26 continues accelerating APU 12 until the frequency of the output of generator 18 matches and exceeds that of primary generator 30. As will be appreciated, as the output frequency of generator 18 equals the output frequency of primary generator 30, a phase error results in torque on APU 12. This indicates that the APU generator 18 is now being driven by APU 12. This torque need not be sensed directly. Instead, the increased torque on the APU 12 may be detected by measuring the current provided by electrical generator 18, as generator 18 makes the transition from acting as a motor to acting as a generator. As will be appreciated, at the transition from motor to generator, current through windings of generator 18 will reverse direction. At this point at $T_4$, in step S216, electronic controller 26 may open breaker 22, thereby disconnecting the primary generator 30 from the previously connected electrical load and thereby transferring the load to APU system 10, and bringing the APU system 10 on-line. This results in a small step transfer of the remaining load to APU system 10. Electronic controller 26 may then slow APU 12 so that generator 18 outputs current at the nominal steady-state frequency, normally at 400 Hz for aircraft applications. $T_4$ is preferably chosen so that the current output from the primary generator 30 is below a threshhold where an incremental change in torque on the output shaft of APU 12 has an insignificant effect on the APU gearbox 14. Preferably, $T_4$ is chosen so that current output of primary generator 30 is near zero at $T_4$.

Conveniently, by first accelerating APU 12 to near steady-state operating speed at $T_3$, generator 18 is accelerated slightly and smoothly by primary generator 30. Thereafter, once generator 18 is allowed to motor, neither it, nor APU 12 will be subject to shocks as a result of the interconnection to load 28 and primary generator 30. Moreover, use of over-running clutch 16 prevents the transfer of torque to APU 12, as a result of the motoring of generator 18. While a convenient transfer set-point of 98% of steady-state operating speed has been illustrated, a person skilled in the art will readily appreciate that other set-points may cause system 10 to function similarly. For example, a set-point in the range between 90–99.9% of steady-state operating speed may be adequate, depending on the torque and inertial characteristics of the APU generator.

Figure 4:
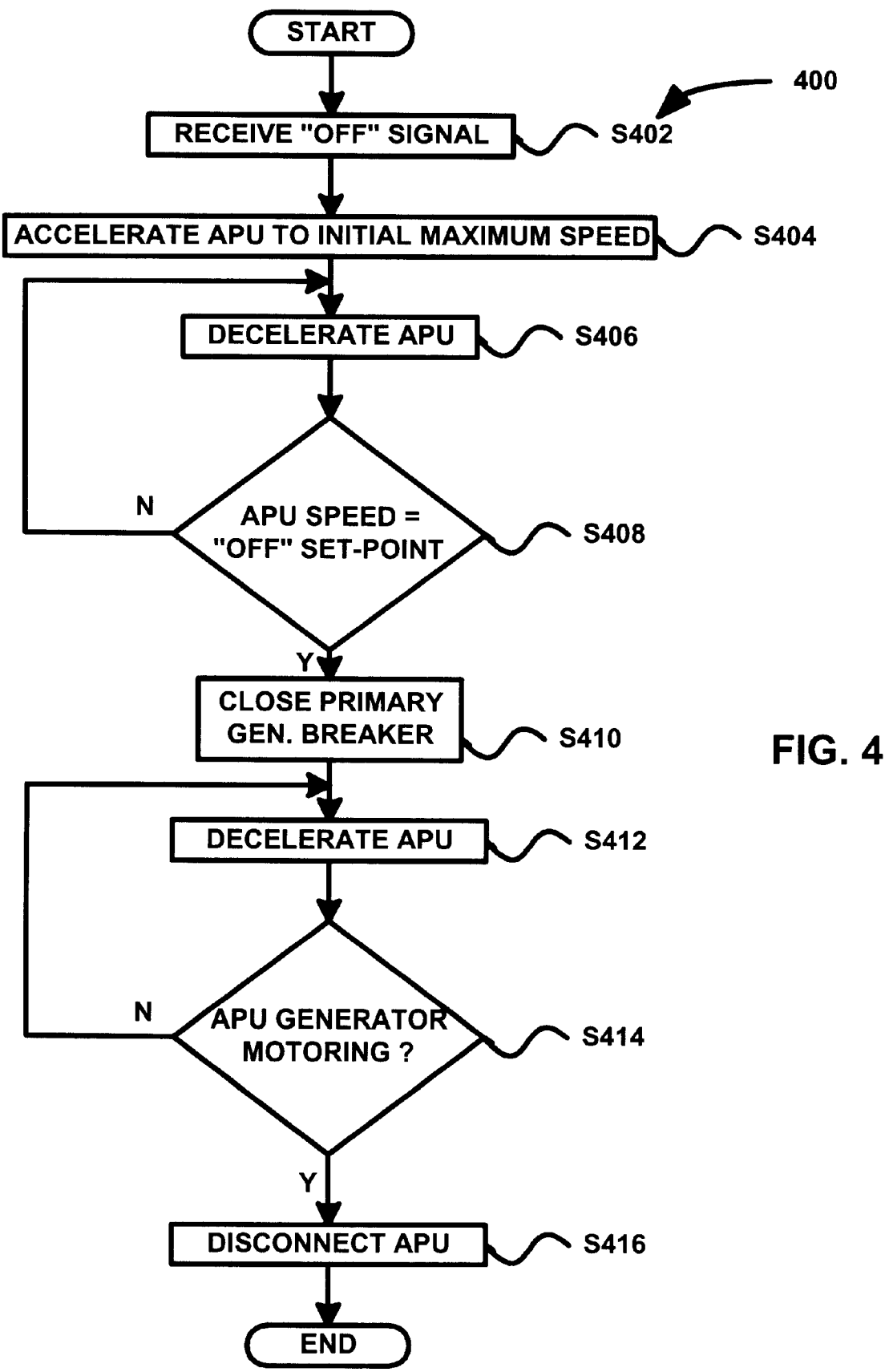
FIG. 4 is a flow chart of steps performed by the system of FIG. 1, coming off-line.
Figure 5:
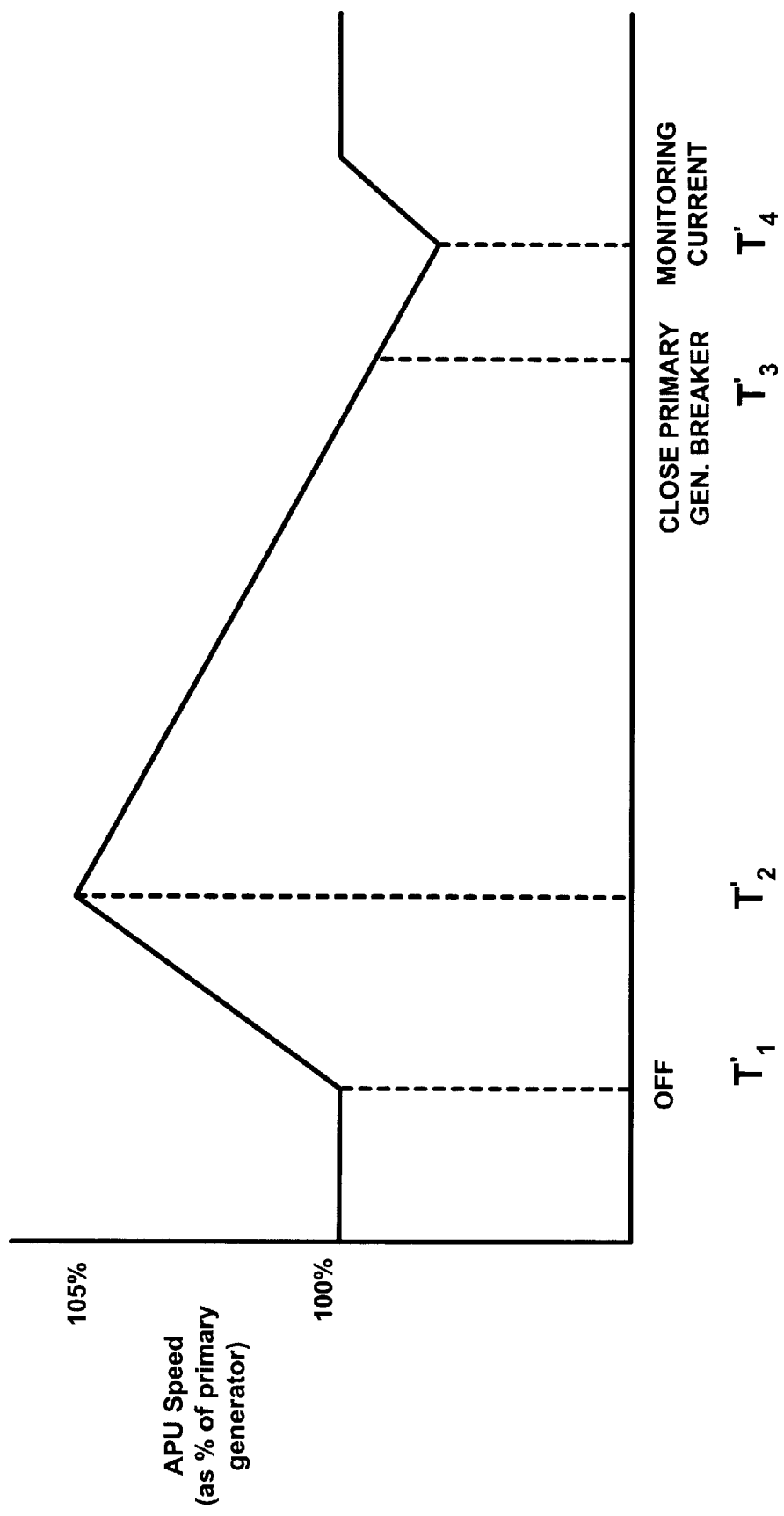
FIG. 5 illustrates an APU speed versus time control curve, used to bring the APU system of FIG. 1 off-line.

An operating APU system 10 may similarly brought off-line in accordance with the steps 400 illustrated in FIG. 4, with a corresponding controlled excursion (speed v. time) of APU 12 illustrated in FIG. 5. As will be appreciated, prior to going off-line, load 28 is powered by APU system 10, with breaker 22 open and breaker 20 closed.

Then, after receiving an off-line control signal in step S402, beginning at $T_1'$, an operating APU 12 is sped up to a peak operating speed at $T_2'$ preferably exceeding the highest anticipated steady-state operating frequency of the primary generator 30, in step S404. Thereafter, APU 12 is slowed in steps S406–S408, until it reaches an "off" set-point, underspeeding the steady state operating speed of primary generator 30 by a small margin, at $T_3'$. Preferably, this "off" set-point will be about 98% of steady-state operating speed of primary generator 30. Of course, any suitable "off" set-point between 90–99.9% could be used. The suitable "off" set-point may, for example, be chosen based on the torque characteristics of the APU generator. Electronic controller 26 then closes breaker 22 (FIG. 1) connecting the primary generator 30 to load 28, in step S410. In response the APU generator 18 is pulled to operate as a motor, at the synchronous speed dictated by the interconnected primary generator 30. Thus, power is no longer provided by APU system 10. Again, optionally the phase difference between generator 18 and 20 may be monitored, and the "off" set-point may be selected based on an additional preferred phase difference. Again, over-running clutch 16, prevents any torque from being transferred by generator 18 to APU 12. APU 12 is continuously decelerated in steps S412 to S414. Controller 26 continuously monitors the amount of current provided by and to generator 18. Once the APU 12 is unloaded, as signified by the motoring of generator 18, the electronic controller 26 opens breaker 20 in step S416, at $T_4'$ thereby disconnecting APU system 10, from load 28. As will be appreciated, APU 12 need not necessarily be sped up to a speed exceeding the highest steady-state frequency provided that generator 18 will motor after breaker 22 connecting the primary generator 30 to the load 28 is closed.

The embodiments described above are intended to be illustrative only and in no way limiting. The described embodiments of carrying out the invention, are susceptible to many modifications of form, size, arrangement of parts, and details of operation. The invention, rather, is intended to encompass all such modification within its scope, as defined by the claims.

What is claimed is:

1. A method of operating an auxiliary power unit ("APU") generator forming part of an APU system, to replace a primary generator operating at a steady-state rotational speed interconnected with a load, said method comprising in sequence, the steps of:

a. adjusting rotational speed of said APU generator, until said APU generator speed is beneath said steady-state rotational speed;

b. interconnecting said APU generator to said load and said primary generator, thereby causing said APU generator to motor at said steady-state rotational speed;

c. increasing said rotational speed of said APU generator, until said generator provides power to said load; and d. disconnecting said primary generator from said load.

2. The method of claim 1, wherein said rotational speed of said APU generator is adjusted in step a. so that said APU generator speed approaches a defined set-point rotational speed, and said method further comprises adjusting said rotational speed of said APU generator, beneath said defined set-point prior to step a.

3. The method of claim 1, further comprising the step of:

e. adjusting an operating speed of said APU generator to an operating speed equal to said steady-state rotational speed.

4. The method of claim 1, wherein said APU system comprises an engine having a rotational output coupled to said generator by an over-running clutch, allowing said APU generator speed to exceed a speed of said rotational output without imparting torque to said engine.

5. The method of claim 4, wherein said engine comprises a turbine.

6. The method of claim 1, wherein said rotational speed of said APU generator is adjusted to approach a defined set-point is between 90 and 99.9% of said steady-state rotational speed.

7. The method of claim 1, wherein step a. comprises sensing an operating frequency of said primary generator to determine said steady-state rotational speed.

8. An auxiliary power unit ("APU") system, for providing electrical power to a load powered by a primary electrical power system operating at a steady-state frequency, said APU system comprising:

an electric generator;

an engine having a rotational output, rotationally coupled to said electric generator;

a controller in communication with said engine to control an operating speed of said rotational output and thereby said generator, said controller operable to:

a. adjust speed of said engine, until said generator produces an electrical output having a frequency beneath said steady-state frequency;

b. interconnect said generator to said primary electric power system, thereby causing said generator to motor at a speed defined by said steady-state frequency;

c. increase said speed of said engine, and said rotational output, until said generator provides power to said load; and d. disconnect said primary generator.

9. The APU system of claim 8, further comprising an over-running clutch coupling said rotational output to said generator, said over-running clutch inhibiting transfer of torque from said electric generator to said engine, while said generator is motoring.

10. The APU system of claim 9, wherein said controller is in communication with said generator to measure current provided by said generator to determine when said generator provides power to said load.

11. The APU system of claim 9, wherein said controller is in communication with an electrical output of said primary electric generator to sense a frequency of output of said primary electric generator, and wherein said controller adjusts said speed of said engine based on sensing said electrical output of said primary generator.

12. The APU system of claim 9, wherein said defined set-point is between 90% and 99% of said operating frequency of said primary electrical power system.

13. The APU system of claim 9, further comprising a gearing assembly, interconnected between said rotational output of said engine and said generator, to match a speed of rotation of said rotational output to said generator.

14. The APU system of claim 8, wherein said engine comprises a turbine.

15. A method of connecting a primary generator to an electrical load, initially powered by an auxiliary power unit ("APU") generator forming part of an APU system, said method comprising in sequence, the steps of:
   a. adjusting rotational speed of said APU generator beneath said steady-state rotational speed of said primary generator;
   b. interconnecting said primary generator operating at said steady-state rotational speed to said load and said APU generator, thereby causing said APU generator to motor at said steady-state rotational speed;
   c. disconnecting said APU generator from said load.

16. The method of claim 15, further comprising the step of increasing an operating speed of said APU generator above said steady-state speed, prior to step a.

17. The method of claim 15, wherein step c. is performed after sensing a motoring current is provided through said APU generator.

18. An auxiliary power unit ("APU") system, for providing electrical power to a load to be powered by a primary electrical power system operating at a steady-state operating frequency, said APU system comprising:
   an electric generator;
   a engine having a rotational output rotationally coupled to said electric generator;
   a controller in communication with said turbine to control an operating speed of said turbine and thereby said generator, said controller operable to:
      a. adjust rotational speed of said turbine until said generator produces an electrical output having a frequency equaling a set-point beneath said steady-state operating frequency of said primary power system;
      b. interconnect said primary power system to said load and said generator, thereby causing said generator to motor at a speed defined by said primary power system; and
      c. disconnect said generator from said load.

19. The APU system of claim 18, further comprising an over-running clutch coupling said rotational output to said generator, said over-running clutch inhibiting transfer of torque from said electric generator to said turbine, while said generator is motoring.

* * * * *